No. 710,303. Patented Sept. 30, 1902.
H. RENTSCH.
CORN PLANTER.
(Application filed Dec. 16, 1901.)
(No Model.) 2 Sheets—Sheet 1.

Witnesses
Alfred W Eicker
John W Rippey

Inventor
Henry Rentsch.
by Higdon & Longan Atty's

No. 710,303. Patented Sept. 30, 1902.
H. RENTSCH.
CORN PLANTER.
(Application filed Dec. 16, 1901.)
(No Model.) 2 Sheets—Sheet 2.
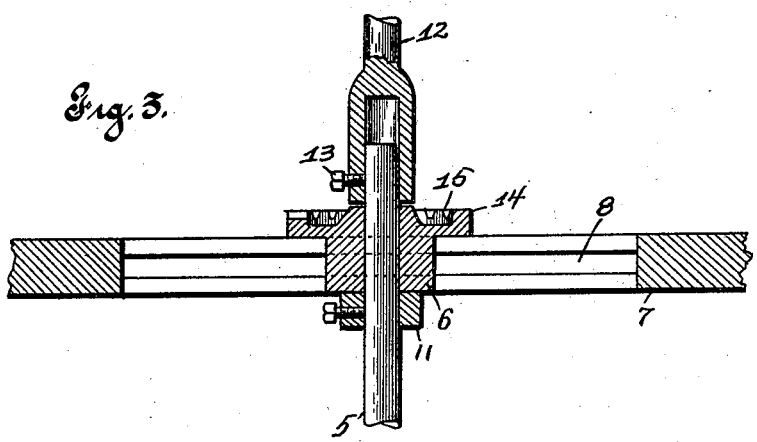
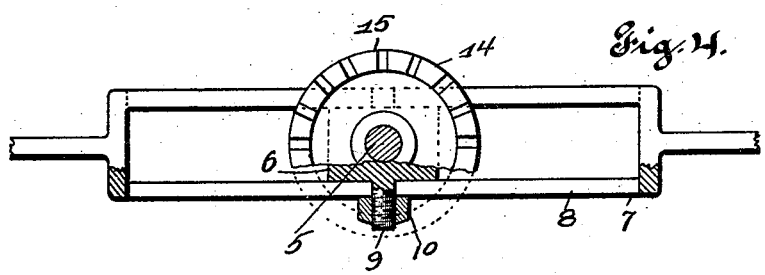
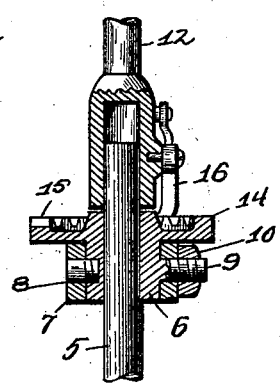 
Witnesses
Alfred O. Eicker
John W. Rippey
Inventor
Henry Rentsch
by Higdon & Longan Attys.

UNITED STATES PATENT OFFICE.

HENRY RENTSCH, OF BACON, MISSOURI.

CORN-PLANTER.

SPECIFICATION forming part of Letters Patent No. 710,303, dated September 30, 1902.

Application filed December 16, 1901. Serial No. 86,110. (No model.)

*To all whom it may concern:*

Be it known that I, HENRY RENTSCH, residing at Bacon, Moniteau county, Missouri, have invented certain new and useful Improvements in Corn-Planters, of which the following is a full, clear, and exact description, reference being had to the accompanying drawings, forming a part hereof.

This invention relates to a corn-planter; and it consists of the novel construction, combination, and arrangement of parts, hereinafter shown, described, and claimed.

One object of this invention is to provide a corn-planter with devices for forming deep furrows to receive the seed-corn, so that the corn will be planted and covered some distance below the top of the ground.

Another object is to provide mechanism adapted to be attached to any ordinary corn-planter, the said mechanism being constructed to form furrows, the depth of which may be regulated, to receive the seed-corn, so that the covering of the corn will be some distance below the surface of adjacent ground.

My invention consists of the combination, with the corn-planter having a runner or furrow-opener, of frames mounted one on each side of each runner, bearing-blocks mounted in each of said frames and adapted to be adjusted backwardly and forwardly, disk-holding standards mounted in said bearing-blocks, disks carried by said standards, said disks being preferably set to throw the dirt outwardly from said runner, a gear-rack rigid with each of said bearing-blocks, a hand-lever connected to each of said standards, a pawl carried by each of said hand-levers for engaging said gear-racks, and means of operating the pawls, the forward edges of said disk cutters being preferably in the same running line, one slightly behind the other, and said forward edges being in front of the cutting part of the runner or furrow-opener.

Figure 1:
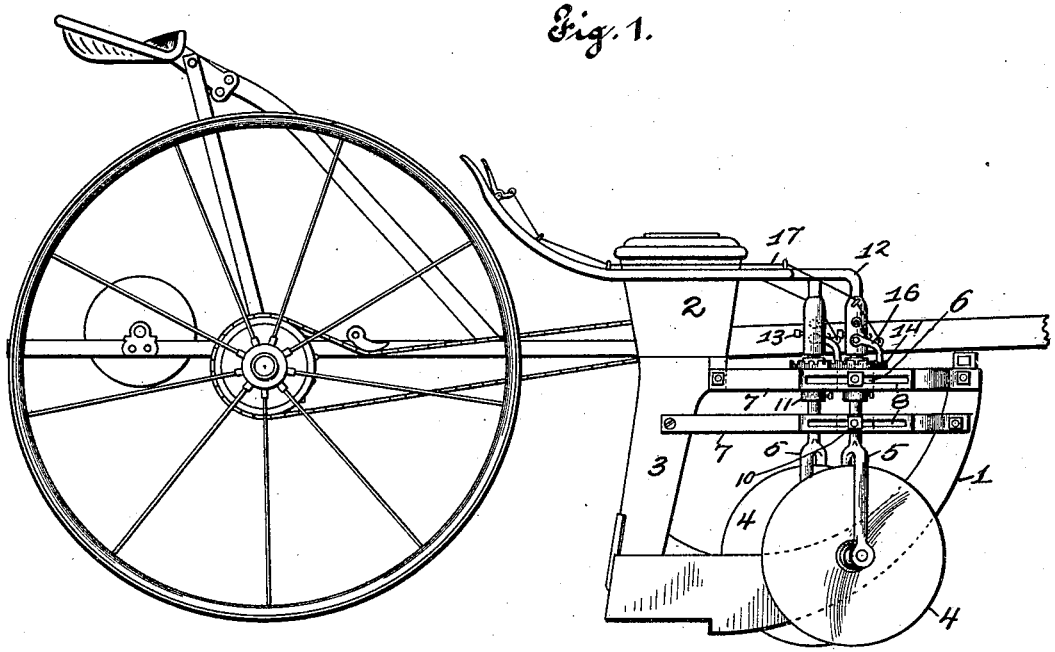
Figure 2:
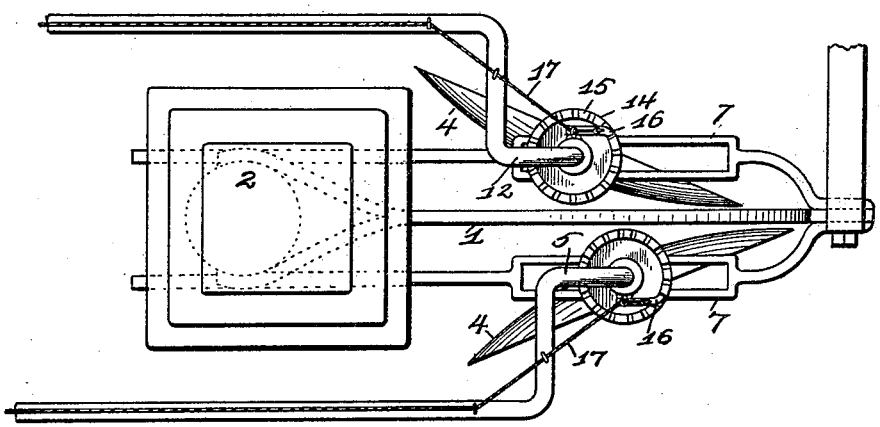

Figure 1 is a side elevation of the corn-planter having my invention applied thereto. Fig. 2 is an enlarged plan view showing one of the runners or furrow-openers of the planter with the attachments supported in operative position. Fig. 3 is an enlarged sectional view showing the devices by which the furrow-forming attachments are adjusted in different positions. Fig. 4 is a plan view of the parts shown in Fig. 3, a portion of the device being broken away. Fig. 5 is a sectional view of another portion of the adjusting mechanism. Fig. 6 shows a furrow which has been formed by my improved attachment after the corn has been planted.

In Fig. 1 I have shown a corn-planter of a standard type, provided with the usual runners 1, the corn-boxes 2, and the guide-tubes 3, through which the corn passes to the ground.

It is well known that in dry seasons it is desirable to plant the corn at a greater depth than in wet or normal seasons; but it is necessary that the corn be not covered at too great a depth when originally planted, or its growth will be retarded, and it may not grow above the surface of the ground.

The devices which I make use of to form the furrows consist of the disks 4, which are supported at the sides of the runners or furrow-openers 1, with their forward edges thrown in toward each other, as shown in Fig. 2, in order to scoop out a furrow, one form of which is shown in Fig. 6. The disks 4 are set with their forward edges substantially in the same running line, and said forward edges are in front of the cutting part of the runner or furrow-opener 1, and said disks are set to throw the dirt outwardly and form a furrow for the runner or furrow-opener. These disks are of the well-known type, and their outer surfaces are concave and their inner surfaces convex, so that the dirt or soil will be thrown laterally from each runner by the rotation of the said disks, which are supported in such position that they project into the ground. There are two disks for each runner, one at each side thereof, and the said disks are supported by the bifurcated standards 5, which are adjustably supported in the bearing-blocks 6, the latter being mounted in the frames 7. Each standard, as may be seen in Fig. 2, is provided with its independent frames 7, which are connected in any desired manner to the runners 1 or to some other part of the planter-frame.

The frames 7 are provided with slots 8 in their sides, and the bearing-blocks 6 have integral projections 9, which extend into the said slots 8, and thereby support the said bearing-blocks in position.

It will be seen that the slots 8 extend throughout the length of the main portion of the frames 7, so that the bearing-blocks 6 can be moved into different positions, and thereby afford means for adjusting the disks 4 farther to the front or rear, as may be desired. This permits the independent adjustment of the disks, so that one can be carried at the forward end of its frame 7 and the other can be supported at a different position.

One of the projections 9 is threaded, as shown in Fig. 4, and a nut 10 may be screwed into the said projection to bear against the frame 7, and thereby hold the bearing-blocks 6 rigid in whatever adjustment it is placed to prevent accidental movement of disks 4 while planter is being used.

The standards 5 turn freely within the bearing-blocks 6, and a collar 11 is mounted upon each standard below the bearing-blocks 6 to prevent the said standard from being forced upwardly. The said collars 11 are adjustable, so that the standard may be adjusted up or down to form furrows of different depths. As shown in Fig. 3, the standards 5 project above the bearing-blocks 6 and extend into the hollow lower ends of the regulating-levers 12 and are adjustably held therein by means of the set-screws 13. When the disks have been adjusted for use, the lower ends of the levers 12 are adjusted to the bearing-blocks 6 so that the disks 4 can be raised out of ground and above the surface thereof whenever desired. The ends of the levers support the weight of the said disks 4 and standards 5 by bearing up the bearing-blocks 6.

A circular plate 14 is integral with or rigidly connected to the upper surfaces of each of the bearing-blocks 6. An annular gear-rack 15 is formed upon each of the said plates 14. A spring-actuated dog or pawl 16 is carried by the lower end of the levers 12 and engages with the teeth 15, thereby preventing the levers 12, the standards 5, and the disks 4 from turning or becoming disarranged after they have once been adjusted.

Suitable connections 17 may be made use of for releasing the dogs or pawls 16, so that the disks may readily be turned into any position.

As shown in Fig. 1, it is preferable that the levers 12 and the connections 17 be convenient to the driver of the planter, so that he may readily adjust the different parts without the necessity of moving from his seat.

In operation the frames 7 are connected to some part of the planter, so that the disks 4 will be supported at the sides through the runners 1 in substantially the positions shown. The standards 5 are then adjusted at the required height within the bearing-blocks 6, and the said bearing-blocks 6 are moved to the proper position wherein it is desired to operate the disks.

The forward ends of the disks can be turned near to or farther from each other by operating the levers 12, releasing the dogs or pawls 16, which hold the said parts stationary when in engagement with the teeth 15. When the said dogs or pawls 16 have been released, the levers 12 may be turned to adjust the disks, and the said levers may be operated as frequently as desired. The disks 4 may be adjusted at different heights in order to form furrows of different depths, and the said disks being round will leave a ridge in the bottom of the furrow, as shown in Fig. 6, and upon this ridge the seed-corn drops and is covered by the soil which is drawn into the furrow by the planter-wheels, but at a depth considerably below the surrounding surface-level.

I claim—

1. The combination with a corn-planter of frames mounted adjacent to each runner, a bearing-block mounted on each of said frames, means for holding said blocks stationary, and standards projecting through each of said bearing-blocks, and disks carried by said standards, a gear-rack rigid with each of the bearing-blocks, a lever connected to each said standard for rotating the same, a pawl carried by each of said levers for engaging with the said rack and suitable connections adjacent to the side of the planter for releasing the pawls, so that the standards may be turned, substantially as described.

2. The combination with a corn-planter having a runner or furrow-opener; of frames mounted one on each side of said runner; bearing-blocks mounted one in each of said frames, and adapted to be adjusted back and forth; disk-holding standards mounted in said bearing-blocks; disks carried by said standards; a rack rigid with each of said bearing-blocks; a lever connected to each of said standards for rotating the same; and a pawl carried by each of said levers for engaging said racks and holding said standards in a desired position, substantially as specified.

3. The combination with a corn-planter having a runner or furrow-opener; of frames mounted one on each side of said runner; bearing-blocks mounted one in each of said frames; disk-holding standards mounted in said bearing-blocks, and adapted to be adjusted up and down; disks carried by said standards; a gear-rack rigid with each of said bearing-blocks; a lever connected to each of said standards; and a pawl carried by each of said levers for engaging said racks, substantially as specified.

In testimony whereof I affix my signature in presence of two witnesses.

HENRY RENTSCH.

Witnesses:
ALFRED A. EICKS,
JOHN D. RIPPEY.